United States Patent
Reznic

(10) Patent No.: US 10,779,275 B2
(45) Date of Patent: Sep. 15, 2020

(54) SINGLE CHANNEL BI-DIRECTIONAL COMMUNICATIONS CONTROL

(71) Applicant: Amimon Ltd., Ra'anana (IL)

(72) Inventor: Zvi Reznic, Tel Aviv (IL)

(73) Assignee: AMIMON LTD., Ra'anana (IL)

( * ) Notice: Subject to any disclaimer, the term of this patent is extended or adjusted under 35 U.S.C. 154(b) by 0 days.

(21) Appl. No.: 16/300,569

(22) PCT Filed: Jun. 12, 2017

(86) PCT No.: PCT/IL2017/050649
§ 371 (c)(1),
(2) Date: Nov. 11, 2018

(87) PCT Pub. No.: WO2017/216787
PCT Pub. Date: Dec. 21, 2017

(65) Prior Publication Data
US 2019/0289597 A1    Sep. 19, 2019

Related U.S. Application Data

(60) Provisional application No. 62/350,726, filed on Jun. 16, 2016.

(51) Int. Cl.
*H04W 72/04* (2009.01)
*G05D 1/00* (2006.01)
*G08C 17/02* (2006.01)
*H04W 72/00* (2009.01)

(52) U.S. Cl.
CPC ...... *H04W 72/0446* (2013.01); *G05D 1/0022* (2013.01); *G08C 17/02* (2013.01); *H04W 72/00* (2013.01)

(58) Field of Classification Search
CPC ........... B64C 2201/146; B64C 39/024; H04W 84/042
See application file for complete search history.

(56) References Cited

U.S. PATENT DOCUMENTS

| | | | |
|---|---|---|---|
| 5,521,817 A | 5/1996 | Burdoin | |
| 7,808,953 B2 | 10/2010 | Kuroda | |
| 2002/0080719 A1 | 6/2002 | Parkvall | |
| 2013/0044677 A1* | 2/2013 | Lucidarme | H04B 7/18504 370/316 |
| 2017/0353548 A1* | 12/2017 | Lin | H04L 67/10 |
| 2018/0152939 A1* | 5/2018 | Lee | H04W 72/0413 |
| 2019/0053135 A1* | 2/2019 | Hahn | H04W 48/16 |

FOREIGN PATENT DOCUMENTS

WO    2015/185726    11/2015

OTHER PUBLICATIONS

International Search Report for PCT/IL2017/050649, dated Oct. 2, 2017.
Written Opinion of the International Search Authority for PCT/IL2017/050649, dated Oct. 2, 2017.

* cited by examiner

*Primary Examiner* — Gregory B Sefcheck
*Assistant Examiner* — Debebe A Asefa
(74) *Attorney, Agent, or Firm* — Eitan Mehulal Sadot

(57) ABSTRACT

A method of allocating time for uplink communications between a remote control unit and a drone system includes interrupting downlink communications from the drone.

6 Claims, 5 Drawing Sheets

SINGLE CHANNEL BI-DIRECTIONAL COMMUNICATIONS CONTROL

This application is a National Stage of PCT international application number PCT/IL2017/050649, having an international filing date of Jun. 12, 2017, published as international publication number WO 2017/216787 A1, which is incorporated herein by reference; which claims priority and benefit from U.S. provisional patent application 62/350,726, filed Jun. 16, 2016, which is incorporated herein by reference.

This application claims priority and benefit from U.S. provisional patent application 62/350,726, filed Jun. 16, 2016, which is incorporated herein by reference.

FIELD OF THE INVENTION

The present invention relates to remotely controlled vehicles (RCVs) generally and to a system for controlling single channel bi-directional communications in remotely piloted vehicles (RPV) such as drones.

BACKGROUND OF THE INVENTION

Technological advancements have contributed to an increased popularity in remotely piloted vehicles (RPVs) which may be used for recreational purposes. Some of these RPVs may include flying vehicles such as planes and multi-rotor flying vehicles, more commonly referred to as "drones". Many drone RPV systems may include First Person View (FPV) where the human operator controlling the drone, otherwise known as the "pilot, views the surroundings as if actually sitting on the drone.

A typical FPV system is schematically shown in the block diagram of FIG. 1. FPV system 100 may include a FPV drone 102 with a video acquisition system 104, goggles 106 which may be worn by the pilot and which may display video received from the drone's video camera, and a remote control unit 108 which is used by the pilot to control the drone's operation. The video from video acquisition system 104 may be wirelessly transmitted by means of a transmitting station (XMIT) 110 on the drone to a receiver (RCV) 112 which may be installed on goggles 106 and may allow the pilot to view the video real-time. The remote control unit may be a handheld unit, and may include a transmitting station (XMIT) 114 to wirelessly transmit the control signals to a receiver (RCV) 116 in the drone. Drone 102 may additionally include a controller 117 which may control all video acquisition and transmitting functions, as well as all flight control functions.

The wireless communications link in the FPV system may be considered bi-directional, with the video transmitted in a downward direction from drone 102 to receiver 112 in goggles 106, and the control signals in an upward direction from remote control unit 108 to the drone. For convenience hereinafter, the communications link may be referred to as "downlink" and may be represented by arrow 118 for the downward direction, and "uplink" for the upward direction represented by hatched arrow 120. Generally, it may be desired that uplink 120 and downlink 118 share the same radio channel instead of using separate channels as this may allow for a substantial reduction in the amount of hardware required, thereby potentially resulting in savings in system cost, weight and size. Furthermore, using the same radio channel may save spectrum resources compared to using two channels, which is also potentially advantageous as spectrum resources are generally quite limited.

FPV systems using the same channel for the uplink and the downlink may rely on a channel access method known as TDMA (Time Division Multiple Access) where the channel is divided into different time slots during which the transmitting stations may transmit. These time slots may be used by the transmitting station in the drone for downlink communications and by the transmitting station in the remote control unit for uplink communications. A MAC (multiple access controller) may coordinate the transmissions between the respective stations to reduce possible transmission collisions as a result of both stations transmitting at the same time. The MAC may use one of two possible functional configurations, a central management configuration or a distributed management configuration. With the central management configuration, only one of the stations (i.e., in the drone or in the remote control unit) may manage the TDMA by allocating the time slots to all the stations. With the distributed management configuration, each station may manage its own slots and may decide when to transmit.

FPV systems commonly use Wi-Fi as a communications scheme between the different elements in the system (i.e. goggles, controller, and drone). In Wi-Fi, the mechanism for central management is known as PCF (Point Coordination Function) while that for distributed management is known as DCF (Distributed Coordination Function). PCF is generally an optional function and is not supported by all Wi-Fi devices. DCF, on the other hand, is mandatory for all Wi-Fi devices and is therefore supported by all. Consequently, for FPV systems, use of the distributed management configuration may be more commonly used than the central management configuration.

The DCF may be based on CSMA/CA (Carrier sense multiple access with collision avoidance) and may include use of a binary exponential backoff. CSMA/CA is a protocol which requires a station wishing to transmit to listen for the channel status for a distributed inter-frame space (DIFS) interval. If the channel is found busy during the DIFS interval, the station should defer its transmission to avoid collisions. DCF may also specify a random backoff (e.g. binary exponential), which may force a station to defer its access to the channel for an extra period of time. The length of the backoff period may be randomly generated by each station. In case several stations wish to transmit (right after the termination of the current transmission) the station which randomly picked the lowest backoff may start transmitting. Stations which lost the opportunity to transmit, (since one of the other stations started transmitting before), may not continue the backoff count from the point where it stopped, rather they may have to randomly draw a new backoff value and start the count from the beginning.

FIG. 2 schematically illustrates a functional block diagram of a FPV drone 202 using same channel bidirectional communications, as generally known in the art. Components in drone 202 which are functionally similar to those shown in drone 102 of FIG. 1 are identified by the same reference numbers. Drone 202 may include video acquisition system 104, a transmitting station (XMIT) 210 including an internal buffer 103 (internal transmit queue), a receiver (RCV) 116 and a controller 117.

In operation, video data 105 from video acquisition system 104 may be transferred to internal transmit queue 103 in transmitting station 210. Video data 105 may include real-time data acquired by the video camera in video acquisition system 104, and may be compressed and/or otherwise encoded. Video data 105 may be temporarily stored in internal transmit queue 103 pending TDMA transmission by transmitting station 210 of the video data using DCF with random backoff or other access control. Transmitting station 210 may use any known wireless communication method suitable for transferring video data 105 to the remote control unit (e.g. remote control unit 108 in FIG. 1) and may include, for example, WiFi or other communication systems, for example a communication system which complies with European regulation ETSI EN 301 893 v1.8.1. Receiver 116 may receive flight control and other control data from the remote control unit and may transfer the data, represented by arrow 109, to controller 117. Similarly to transmitting station 210, the control data may be sent by the remote control unit using wireless TDMA transmission.

FIG. 3 schematically illustrates a functional block diagram of an improved RPV drone 302 using same channel bidirectional communications, as generally known in the art. Drone 302 may include video acquisition system 104, transmitting station 210 including internal buffer 103 (internal transmit queue), receiver 116 and controller 117 similar to drone 202 shown in FIG. 2. Additionally, drone 302 may include an intermediate buffer 307, a video data dump 322, and a downlink control unit 324.

In operation, drone 302 may operate similarly to drone 202 with the added advantage that video data 105 may be temporarily stored in intermediate buffer 307. This may relieve loading of internal transmit queue 103 while transmitting station 210 is waiting for a TDMA slot to transmit. If during the random backoff process internal transmit queue 103 is filled and transmitting station 210 is unable to gain a transmission slot, DL control unit 324 may divert new video data from video acquisition 104 to dump 322 until transmitting station 210 gains a transmission slot and transmits the video in internal transmit queue to the remote control unit.

SUMMARY OF THE PRESENT INVENTION

There is provided, in accordance with an embodiment of the present invention, a method of allocating time for uplink communications between a remote control unit and a drone system including interrupting downlink communications from the drone.

There is provided, in accordance with an embodiment of the present invention, a system for allocating time for uplink communications between a remote control unit and a drone system including a downlink controller to interrupt downlink communications from the drone.

In accordance with an embodiment of the present invention, the downlink controller is installed on the drone.

In accordance with an embodiment of the present invention, the interrupting occurs upon lack of detection of uplink communications between the remote control unit and the drone over a predetermined interval of time, T1.

In accordance with an embodiment of the present invention, the uplink communications and the downlink communications are over a same communications channel.

In accordance with an embodiment of the present invention, the downlink communications is interrupted for a predetermined interval of time, T2.

In accordance with an embodiment of the present invention, T2 is at least the sum of the longest uplink command transmission plus the longest expected back-off time.

In accordance with an embodiment of the present invention, the clearing includes any one of delaying or dumping downlink video.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
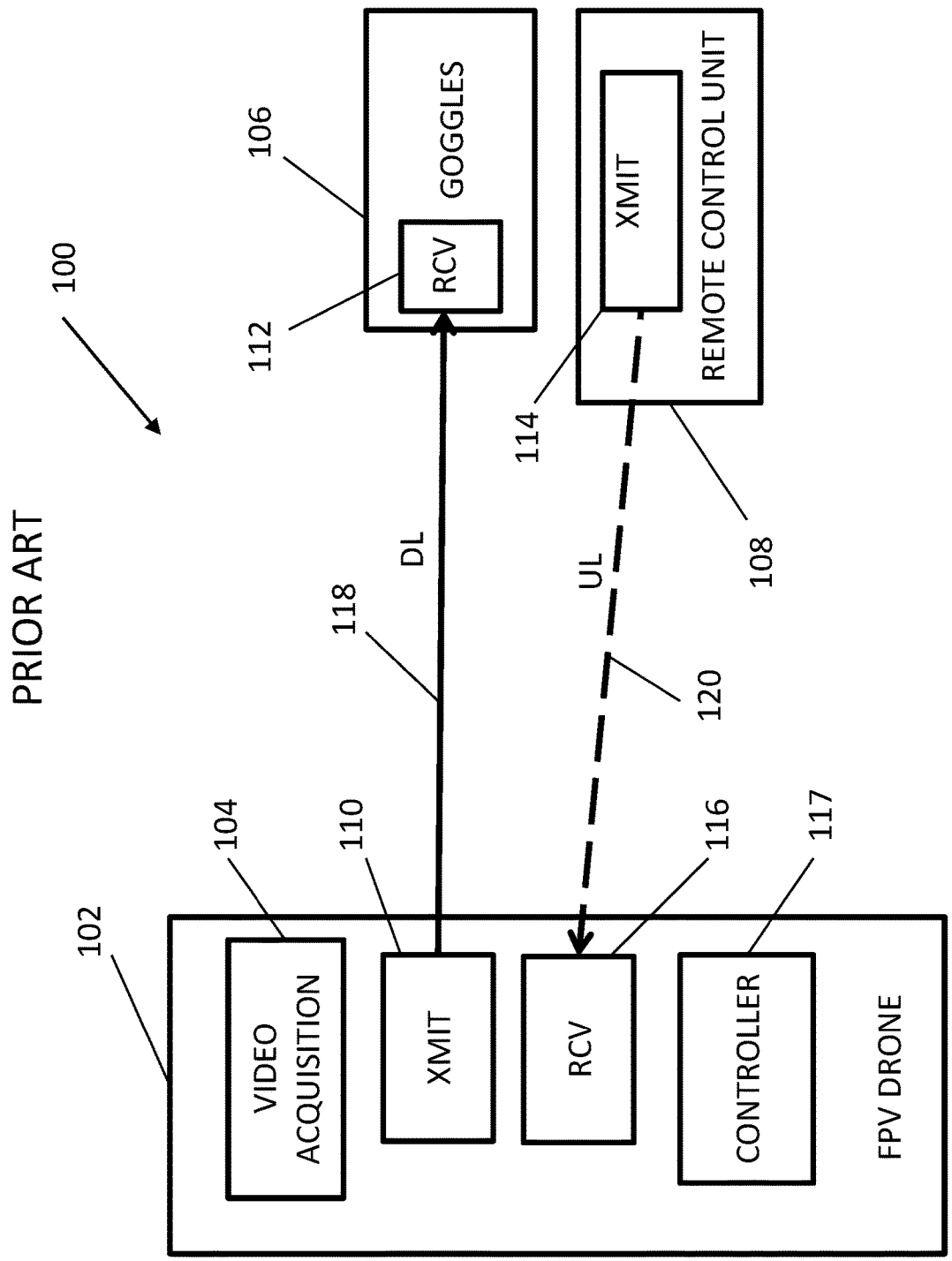
FIG. 1 schematically illustrates a typical FPV system as generally known in the art.
Figure 2:
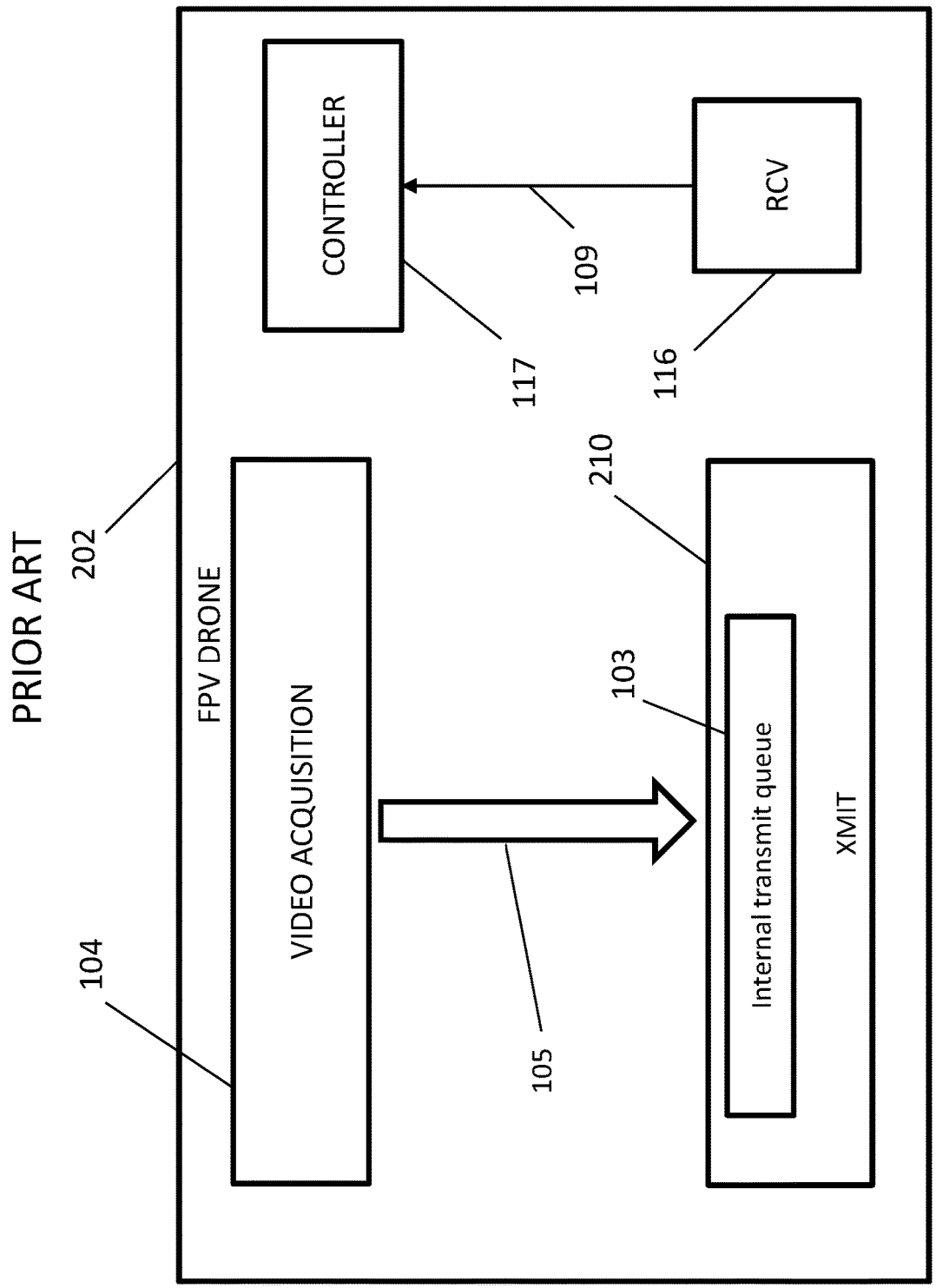
FIG. 2 schematically illustrates a functional block diagram of a FPV drone using same channel bidirectional communications, as generally known in the art.
Figure 3:
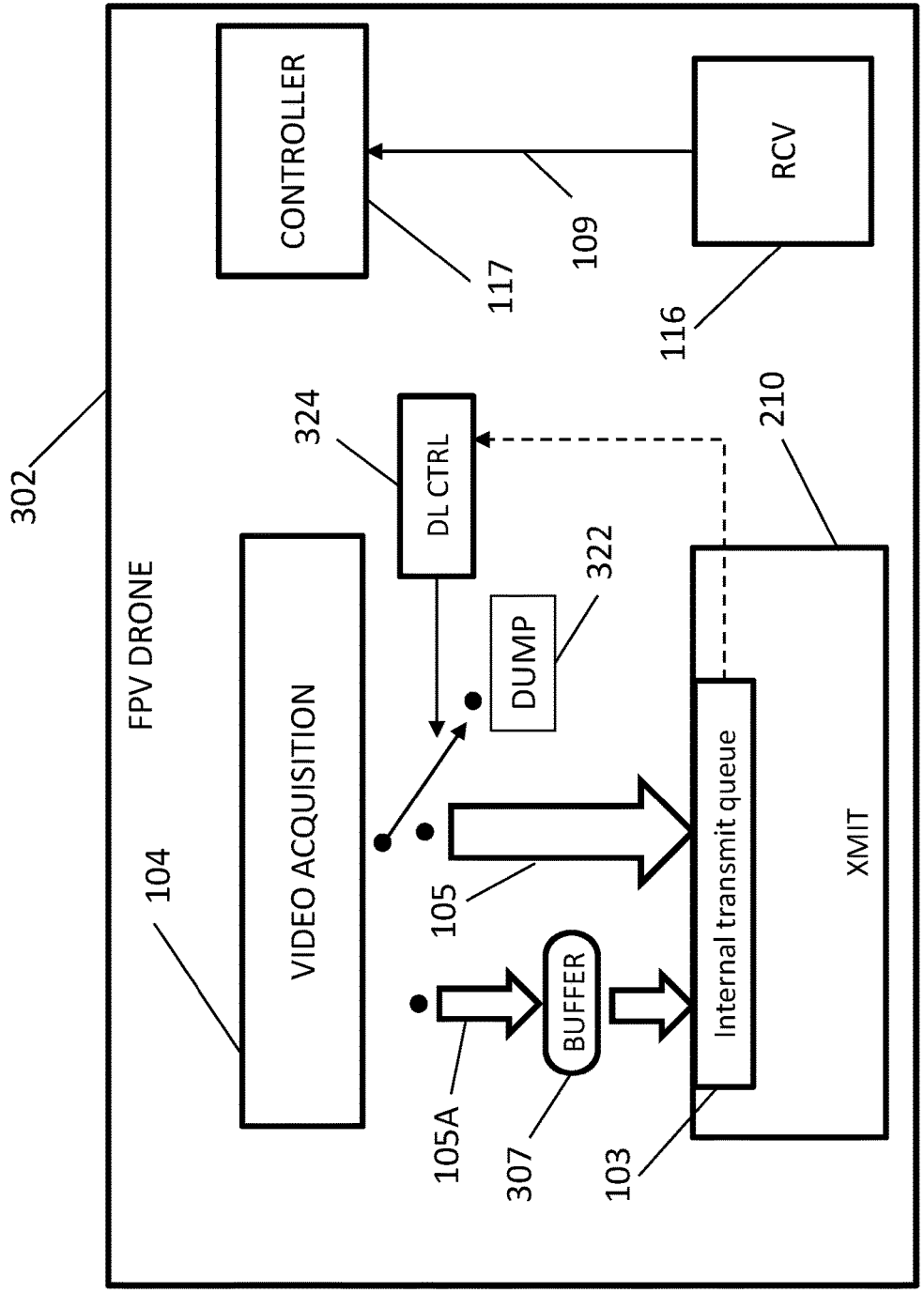
FIG. 3 schematically illustrates a functional block diagram of an improved RPV drone using same channel bidirectional communications, as generally known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a potential drawback of DCF based on CSMA/CA with random backoff is that the period of time (delay) between the time a station wishes to transmit information until it actually can transmit it may be large as a result of "poor luck" in the random backoff drawings. Applicant has further realized that this potential drawback may affect the performance of FPV systems which use TDMA between the downlink video and the uplink control as the downlink occupies the channel for a large percentage of the time. More particularly, DCF with random backoff, combined with high channel occupancy due to the downlink, can occasionally delay the remote control transmission for a long time and may affect fast maneuvering and quick response time which may be required for fast flying drones to avoid crashing into one another or into obstacles such as trees, structures, and even into the ground.

Applicant has realized that the aforementioned problem may be solved by having the downlink transmitting station allow the uplink transmitting station sufficient opportunity to transmit. This may be achieved by having the drone unit discontinue downlink transmissions if it did not receive a certain pre-defined amount of uplink data during a certain pre-defined period of time. If such will be the case, the drone transmitting station will stop competing over the channel, and wait for uplink transmissions from the remote control unit transmitting station before attempting to transmit again.

Applicant has additionally realized that the aforementioned solution may be implemented using an uplink traffic monitor unit which monitors the amount of time which has transpired between drone reception of control data from the remote control unit. The implementation may be through the MAC or in layers above the MAC. Implementation above the MAC layer may be done by "starving" the drone transmitting station, that is, by not supplying new data to the WiFi MAC. This may be potentially advantageous as it may allow a drone manufacturer to integrate a standard, off-the-shelf WiFi (or other wireless standard, e.g. ETSI v1.8.1) transceiver in the drone and may not require changing any of the WiFi hardware or software in the drone (or otherwise in the FPV system).

Applicant has further realized that the solution may be implemented on the drone side only. This may allow a user to purchase the drone from one manufacturer and the remote control unit from another manufacturer. Furthermore, it may allow implementation of the remote control unit as an application program in a smartphone, tablet, or other suitable computing device.

Figure 4:
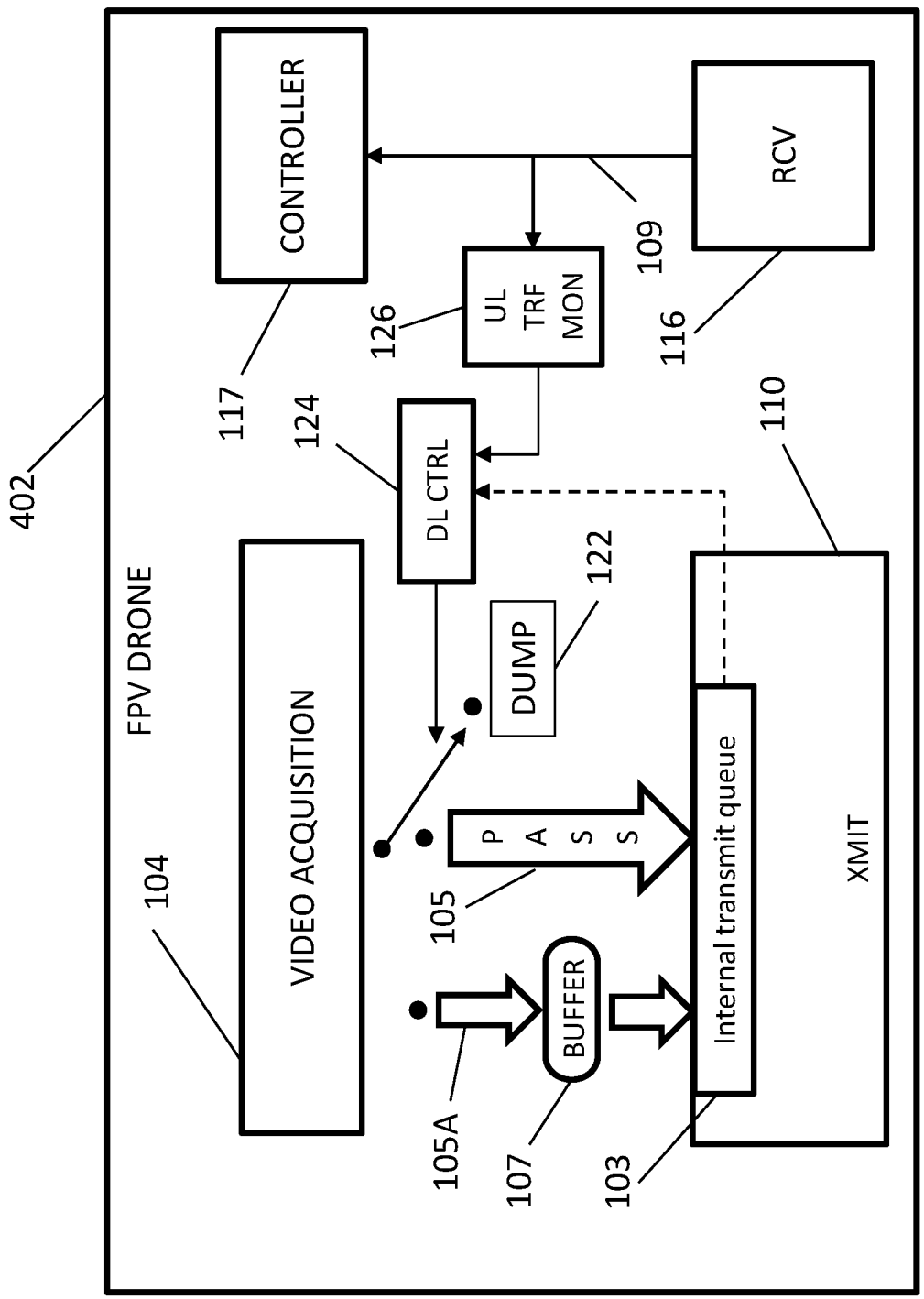
FIG. 4 schematically illustrates a functional block diagram of an exemplary RPV drone using same channel bidirectional communications and including an uplink traffic monitor unit (UL TRF MON), according to an embodiment of the present invention.

Reference is now made to FIG. 4 which schematically illustrates a functional block diagram of an exemplary RPV drone 402 using same channel bidirectional communications and including an uplink traffic monitor unit (UL TRF MON) 126, according to an embodiment of the present invention. Drone 402 may be functionally similar to drone 302 with the added functionality provided by uplink traffic monitor 126.

UL traffic monitor 126 may sense reception of control data 109 from the uplink control data received from the remote control unit. Upon sensing lack of reception of a certain pre-defined amount of control data 109 during a certain pre-defined period of time T1, UL traffic monitor 126 may activate DL control unit 124 to cause transferring of all new video data to dump 122, thereby "starving" transmitting station 110. Starving transmitting station 110 may discontinue downlink transmissions from drone 102 and may allow the transmitting station in the remote control unit to gain access to TDMA slots and to transmit control data to receiver 116 in drone 102.

Figure 5:
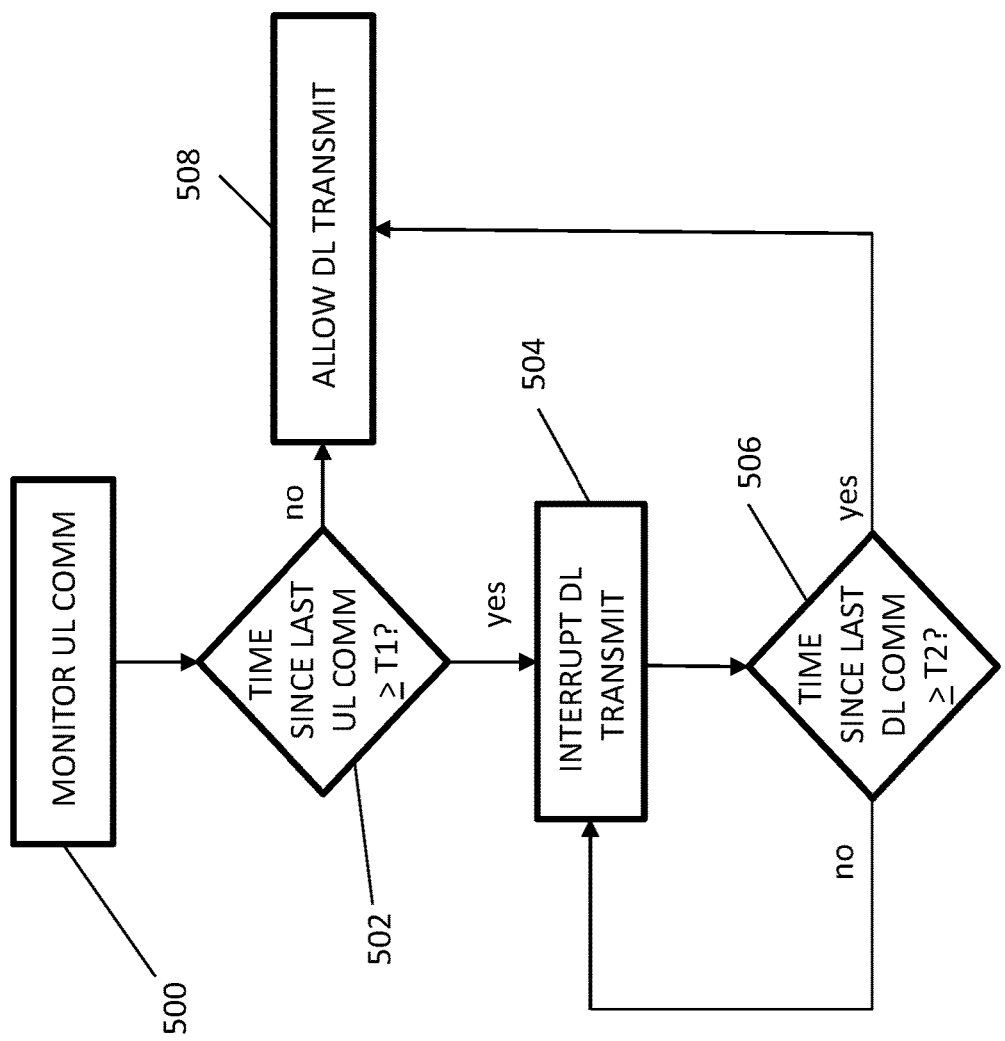
FIG. 5 is a flow diagram of a method to control single channel bidirectional communications between a remote control unit and a drone in FPV drone systems, according to an embodiment of the present invention.

Reference is now made to FIG. 5 which is a flow diagram of a method to control single channel bidirectional communications between a remote control unit and a drone in FPV drone systems, according to an embodiment of the present invention. For exemplary purposes, the method may be described with reference to the embodiment of the present invention shown in FIG. 4. The skilled person may appreciate that the method may not be limited to the number and order of steps illustrated and described herein below, and that it may be practiced with more or less steps, and with variations in the order of steps.

At 500, UL traffic monitor unit 126 may monitor the transfer of control data 109 received from UL data from remote control unit and transferred from receiver 116 to controller 117.

At 502, UL traffic monitor 126 may determine whether the amount of control data 109 transferred and/or the time which has transpired since the last control data transfer meets predefined criteria. If the time that has transpired since the last transfer of control data 109 is greater than or equal to the predetermined amount of time T1, continue. Otherwise, go to 508.

At 504, UL traffic monitor 126 may activate DL control unit 124 to "starve" transmitting station 110. All new video data 105 from video acquisition system 104 is transferred to dump 122. Additionally or alternatively, transmitting station 110 may cease all requests to gain access to TDMA slots for transmission.

At 506, UL traffic monitor 126 may measure an amount of time that has transpired since initiation of "starve" and/or since ceasing all DL transmissions from transmitting station 110. If the amount of time is greater than or equal to a predetermined amount of time T2 where T2 is at least the sum of the longest uplink command transmission plus the longest expected backoff time, continue. Otherwise, return to 504.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
a drone comprising:
a video acquisition unit, to acquire video;

a video data queue, to temporarily store acquired video data that is intended to be wirelessly transmitted over a Wi-Fi downlink upon availability of a Wi-Fi transmission opportunity in accordance with a Wi-Fi Carrier-Sense-Multiple-Access (CSMA) scheme;

a Wi-Fi transceiver, to wirelessly transmit video over a Wi-Fi downlink towards a Wi-Fi receiver of a drone operator unit, and to wirelessly receive control commands over a Wi-Fi uplink from a Wi-Fi transmitter of said drone operator unit, wherein said Wi-Fi downlink and said Wi-Fi uplink utilize a single same Wi-Fi communication channel;

an uplink traffic monitor, (a) to continuously monitor incoming control commands that said drone receives from said drone operator unit over said Wi-Fi uplink, and (b) to detect that a control command was not received from said drone operator unit over said Wi-Fi uplink for at least T seconds, and to activate a downlink starving unit;

a downlink starving unit, to starve said Wi-Fi transceiver of said drone from having video data intended for Wi-Fi transmission over said downlink, for a pre-defined starving period;

wherein the Wi-Fi transceiver of said drone, which is starved from having video data intended for Wi-Fi transmission over said downlink, ceases to transmit video data over said Wi-Fi downlink for said pre-defined starving period and vacates said single Wi-Fi channel to be available for uplink Wi-Fi transmission of one or more control commands from said drone operator unit to said drone.

2. The system of claim 1, wherein the downlink starving unit performs diversion of acquired video data, originating from said video acquisition unit, towards a temporary video dump in said drone, instead of towards said video data queue that is intended for downlink Wi-Fi transmission.

3. The system of claim 1, wherein the downlink starving unit performs starving of said video data queue for a pre-defined starving period that is a sum of (I) a longest time-period that is required for Wi-Fi transmission of a single control command to said drone, plus (II) a longest expected Wi-Fi CSMA backoff time-period that is expected for said Wi-Fi CSMA scheme utilized by said drone and said drone operator unit.

4. The system of claim 1, wherein the downlink starving unit prevents supplying of new acquired video data to a Multiple Access Controller (MAC) of said Wi-Fi transceiver of said drone for said pre-defined starving period.

5. The system of claim 1, wherein the downlink starving unit prevents supplying of new acquired video data to a Multiple Access Controller (MAC) of said Wi-Fi transceiver of said drone for said pre-defined starving period; wherein the downlink starving unit operates in a communication layer that is above the MAC layer.

6. The system of claim 1, wherein video starving operations of the downlink starving unit of said drone, enable the Wi-Fi transmitter of the drone operator unit to gain access to a Wi-Fi CSMA transmission opportunity and to successfully transmit a control command over said Wi-Fi uplink to said Wi-Fi transceiver of said drone.

* * * * *